United States Patent
Hewett et al.

[11] 3,862,196
[45] Jan. 21, 1975

[54] NOVEL 2β-HYDROXY-3α-AMINO-STEROIDS AND DERIVATIVES THEREOF AND THE PROCESSES FOR THEIR PREPARATION

[75] Inventors: Colin Leslie Hewett, Bearsden; David Samuel Savage, Newton Mearns, both of Scotland

[73] Assignee: Akzona Incorporated, Asheville, N.C.

[22] Filed: July 10, 1973

[21] Appl. No.: 377,977

[30] Foreign Application Priority Data
July 14, 1972   Great Britain.................... 33112/72

[52] U.S. Cl....... 260/397.4, 260/397.45, 260/397.5, 424/243, 260/349
[51] Int. Cl.................. C07c 169/20, C07c 169/32
[58] Field of Search.......... 260/397.4, 397.45, 397.5

[56] References Cited
UNITED STATES PATENTS
3,511,859   5/1970   Klimstra............................. 260/349

*Primary Examiner*—Elbert L. Roberts
*Attorney, Agent, or Firm*—Francis W. Young; Philip M. Pippenger; Hugo E. Weisberger

[57] ABSTRACT

The invention relates to novel 2β-hydroxy-3α-amino-steroids of the formula

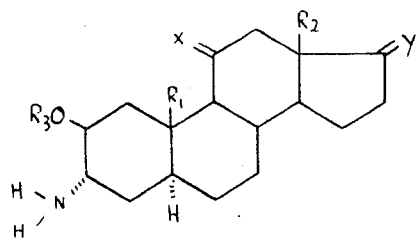

in which
$R_1$ = hydrogen or a methyl group
$R_2$ = an alkyl group having 1-4 carbon atoms
$R_3$ = hydrogen or an acyl radical
$X = H_2$, $H(OR_3)$ or O, and
$Y$ = O, $H(\beta OR_3)$, $R_4(\beta OR_3)$, $H(\beta COCH_3)$ or $H(\beta CHOR_3 CH_3)$, wherein $R_4$ is a saturated or unsaturated lower alkyl group, their salts and esters and the N-acyl-derivatives thereof, and to the processes for their preparation.

The novel compounds are potent anti-arrhythmic agents, devoid of convulsant, local anaesthetic or CNS stimulating activities.

3 Claims, No Drawings

NOVEL 2β-HYDROXY-3α-AMINO-STEROIDS AND DERIVATIVES THEREOF AND THE PROCESSES FOR THEIR PREPARATION

This invention relates to novel 2β-hydroxy-3α-aminosteroids and salts, esters and N-acyl-derivatives thereof, and the processes for the preparation thereof.

A number of steroids substituted in the 2β-position with a hydroxyl group and in the 3α-position with a tertiary amino group are known (British Specification 1,108,563) and some of these have been found to possess anti-arrhythmic activity. However, at therapeutic dose levels these compounds also exhibit undesirable activities such as convulsant activity and local anaesthetic activity which precludes their clinical application. Surprisingly we have discovered that steroids of the androstane, oestrane and pregnane series substituted in the 2β-position with a hydroxyl or acyloxy group and in the 3α-position with a primary amino group are potent anti-arrhythmic agents which are virtually devoid of convulsant or local anaesthetic activities. Moreover the compounds of the invention have no CNS stimulating effects, whereas the corresponding known tertiary amino compounds have such effects.

These novel primary amino steroids therefore have a great advantage over the previously described tertiary amino steroids for use as anti-arrhythmic agents.

Therefore, the present invention relates to a novel group of steroids of the androstane, oestrane and pregnane series having in 2β-position a hydroxy-, or acyloxy group and in 3α-position a primary amino group, and to salts and N-acyl derivatives thereof. An important and specific group of compounds according to the present invention are the novel compounds of the formula:

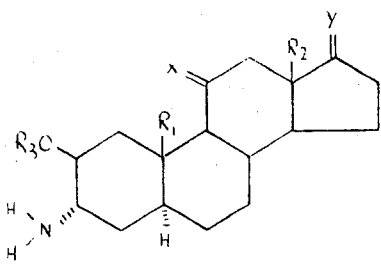

in which
- $R_1$ = hydrogen or a methyl group,
- $R_2$ = an alkyl group having 1–4 carbon atoms,
- $R_3$ = hydrogen or an acyl radical,
- X = $H_2$, $H(OR_3)$ or O, and
- Y = O, $H(\beta OR_3)$, $R_4(\beta OR_3)$, $H(\beta COCH_3)$ or $H(\beta CHOR_3 CH_3)$, wherein $R_4$ is a saturated or unsaturated lower alkyl group, and salts and N-acyl-derivatives of these compounds.

The compounds according to the invention can be prepared by reacting a 2β-hydroxy-3α-halo- or 2β-acyloxy-3α-halosteroid of the androstane, oestrane or pregnane series with ammonia, after which the thus obtained 2β-hydroxy-3α-amino- or 2β-acyloxy-3α-amino-compounds may be converted by methods known per se into salts thereof, and/or may be N-acylated.

The starting Δ²-compounds are described in the literature, for example, in U.S. Pat. No. 2,940,967; South African patent 64/5098; U.S. Pat. Nos. 3,082,223; 3,169,136; 3,338,929; German Pat. No. 1,257,141; Journal Org. Chem. 1961, 3023: and J. Med. Chem. 1966, 685.

The reaction is usually carried out by refluxing the mixture for some time, generally for 1 to 60 minutes. The solvent may be a neutral solvent such as dioxan. The starting substances, e.g. the 2β-hydroxy-3α-halo- or 2β-acyloxy-3α-halo-steroids, can be prepared by reacting a Δ²-steroid of the androstane, oestrane or pregnane series with a hypohalous acid, e.g. N-bromo acetamide or N-chloro succinimide, and aqueous perchloric acid followed, if desired, by acylation of the 2β-hydroxy-group.

An alternative preparation of the compounds according to the invention consists in reacting a 2β,3β-oxido-steroid of the androstane, oestrane and pregnane series with ammonia, after which the thus obtained 2β-hydroxy-3α-amino compound may be converted by methods known per se into 2β-acyloxy-, or 2β-acyloxy-N-acyloxy-derivatives, and/or into salts of these compounds.

The amination reaction may be carried out by heating the reactants together, usually in the temperature range 60° to 250°C; a suitable solvent such as an alcohol, e.g. ethanol, or an ether, e.g. glycol mono alkyl ether may be used. The reaction may by preference be carried out under pressure. It may be of advantage to perform the present reaction in the presence of water.

The 2β,3β-oxido-steroids to be used as starting materials may be prepared, for example, from the previously mentioned 2β-hydroxy-3α-halo-steroids by treatment with alkali.

A further method for the preparation of the 3α-primary amino steroids according to the present invention consists in reacting a 2β,3β-oxido-steroid of the androstane, oestrane and pregnane series with benzylamine, whereafter the 2β-hydroxy- or 2β-acyloxy-3α-benzylamino steroid is submitted to hydrogenolysis e.g. by hydrogenation over a suitable catalyst such as palladium-charcoal.

A further alternative method consists in reacting a 2β,3β-oxido steroid of the androstane, oestrane or pregnane series with an alkali metal azide to give the corresponding 2β-hydroxy-3α-azido steroid which is converted into the 3β-hydroxy-3α-primary amino steroid by reduction, e.g. with hydrogen in the presence of a metal catalyst. The 2β-hydroxy-3α-azido steroid may be acylated first to a 2β-acyloxy-3α-azido steroid before reducing to give a 2β-acyloxy-3α-amino-steroid.

The conversion of the 3α-amino compounds into salts thereof can be carried out by treatment with an organic acid such as citric acid, pyruvic acid, succinic acid, fumaric acid and the like, or an inorganic acid such as hydrochloric acid, hydrobromic acid, phosphoric acid.

A 2β-hydroxy-3α-primary amino steroid may be converted into the mono-N-acyl derivative by acylation with an acid anhydride in a suitable solvent such as methylene chloride; the resulting 2β-hydroxy-N-acyl-3α-amino steroid may be further converted into the 2β-acyloxy-3α-acylamino steroid e.g. by treatment with an acid anhydride which may be different from that used to acylate the amino group, in pyridine.

A 2β-acyloxy-3α-primary amino steroid may be converted into the 2β-acyloxy-3α-acylamino-derivatives by treatment with an acid anhydride, which may be different from that present in the 2-position, in a suitable solvent such as methylene chloride.

A 17-oxo-group, if present, is possibly reduced to a 17β-hydroxy group e.g. with $NaBH_4$.

Free hydroxyl groups, if present in the molecule, may be acylated.

The acylation may take place with an organic carboxylic acid, preferably with an aliphatic, cyclo-aliphatic, aromatic or araliphatic carboxylic acid having 1–18 carbon atoms, like acetic acid, valeric acid, caproic acid, oenanthic acid, capric acid, lauric acid, benzoic acid, and β-phenyl propionic acid, or with a functional derivative thereof, such as the anhydrides or the acid chlorides.

A special group of the compounds of the invention is the group of steroids having the formula:

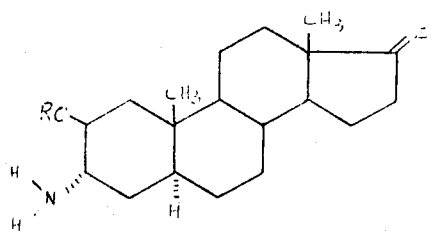

in which
Z = O, H(OH) or COCH$_3$, R = H or acetyl, and the acid-addition salts and the N-acetyl-derivatives thereof.

The new compounds according to the invention may be applied in the form of pharmaceutical preparation, for which purpose they are mixed with carriers suitable for oral administration or for injection.

On account of animal experiments the effective oral dose is envisaged as from 1–50 mg per kg body weight, and the effective intravenous dose as from 0.2–15 mg per kg body weight.

The following examples illustrate the invention.

EXAMPLE I

A solution of 70% perchloric acid (60 ml) in water (280 ml) was added to a stirred solution of 5α-androst-2-en-17-one (200 g) in ether (1.15 l) at 15° followed by portionwise addition of N.bromacetamide (112 g) over 10 minutes. After stirring for 1 hour the precipitated white crystalline solid was filtered off, washed neutral with ether and water and crystallised to give 2β-hydroxy-3α-bromo-5α-androstan-17-one (172 g). The ether layer of the filtrate was washed neutral, dried (Na$_2$SO$_4$) and concentrated to give a second crop (28 g).

The two crops (200 g) were suspended in methanol (1 l), 1ON aqueous potassium hydroxide solution (100 ml) added and the mixture slowly distilled over 45 minutes. Addition of water precipitated the product as a white solid which was filtered off, washed with water, dried and dissolved in ether. Crystallisation from ether: light petrol gave 2β,3β-epoxy-5α-androstan-17-one (88 g).

A solution of the 2β,3β-epoxide (30 g) in ethanol (130 ml), water (15 ml) and liquid ammonia was heated in an autoclave at 150° for 6 hours and the resultant crystalline suspension evaporated to dryness. Water (35 ml) and acetic acid (36 ml) were added and the solution kept at 90° for 1 hour, cooled and excess water added. The precipitated material was filtered off and the filtrate made alkaline with aqueous 1ON potassium hydroxide solution to precipitate a white solid which was filtered off, washed neutral with water, dissolved in methylene chloride, the solution dried (Na$_2$SO$_4$), concentrated and ether added to give 2β-hydroxy-3α-amino-5α-androstan-17-one (14.3 g), m.p. 192°–195°C, [α]$_D^{20}$ = +109° (in chloroform).

Treatment of 2β-hydroxy-3α-amino-5α-androstan-17-one with hydrochloric acid in ethanol gave the hydrochloric acid addition salt, m.p. 285°C (decomp.); [α]$_D^{20}$ = +104.5°C (in ethanol).

The following compounds were prepared in a similar manner:
2β-hydroxy-3α-amino-5α-androstane-11,17-dione,
2β,11α-dihydroxy-3α-amino-5α-androstan-17-one,
2β,11β-dihydroxy-3α-amino-5α-androstan-17-one,
2β-hydroxy-3α-amino-5α-pregnan-20-one,
2β-hydroxy-3α-amino-5α-oestran-17-one,
3α-amino-5α-pregnane-2β,20α-diol,
3α-amino-5α-pregnane-2β,20β-diol,
3α-amino-5α-oestrane-2β,17β-diol,
and their hydrochloric acid-addition salts.

EXAMPLE II

A solution of sodium azide (5.5 g) in water (22 ml) was added to a solution of 2β,3β-epoxy-5α-androstan-17-one (10 g) in dimethylacetamide (50 ml) and the boiling solution stirred for 2 hours, cooled and the product crystallised from methylene-dichloride: ether to give 2β-hydroxy-3α-azido-5α-androstan-17-one as a crystalline solid (7.62 g), m.p. 161°–165°C, [α]$_D^{20}$ = +144° (in chloroform).

This azide (5 g) was hydrogenated in methanol (60 ml) over 5% palladium charcoal catalyst (0.5 g) and the product crystallised from methylene dichloride: ether to give 2β-hydroxy-3α-amino-5α-androstan-17-one (3.56 g) which was identical with an authentic specimen.

EXAMPLE III

A solution of 2β,3β-epoxy-5α-androstan-17-one (10 g) in water (10 ml) and benzylamine (40 ml) was boiled under reflux for 5 hours, cooled and the product precipitated as a white solid (13.8 g) by the addition of water. A solution of this product in acetic acid (25 ml) and water (25 ml) was heated at 90° for 45 minutes, cooled, water (200 ml) added and the suspension filtered. The filtrate was made alkaline by the careful addition of excess aqueous 1ON potassium hydroxide solution to precipitate a white solid (13.8 g) which was filtered off, well washed with water and dried. Crystallisation of this product from methylene dichloride: ether yielded 2β-hydroxy-3α-benzylamino-5α-androstan-17-one (10.58 g), m.p. 168°–173°C.

The 3α-benzylamino-2β-ol (4 g) was hydrogenated in ethanol (150 ml) over 5% palladium charcoal catalyst (1.1 g) and the product crystallised from methylene dichloride: ether to give 2β-hydroxy-3α-amino-5α-androstan-17-one (2.2 g) identical with an authentic specimen.

EXAMPLE IV

Sodium borohydride (1.2 g) was added to a solution of 2β-hydroxy-3α-amino-5α-androstan-17-one (3 g) in methanol (30 ml) and methylene dichloride (9 ml), the solution stirred for 6 hours and the methylene dichloride evaporated off under reduced pressure at 30°. Addition of water precipitated a white solid which was filtered off, washed with water, dried and crystallised from methylene dichloride: ether to give 3α-amino-5α-androstane-2β,17β-diol in prisms (2.4 g), m.p.

218°–227°. Reaction with hydrochloric acid gave the hydrochloric acid-addition salt.

In a similar manner the following compounds were prepared:
3α-amino-5α-androstane-2β,11α,17β-triol
3α-amino-5α-pregnane-2β,20β-diol
3α-amino-5α-oestrane-2β,17β-diol.

EXAMPLE V

A solution 2β-hydroxy-3α-amino-5α-androstan-17-one (6 g) in acetic anhydride (25 ml) and pyridine (10 ml) was kept at 90° for 45 minutes, the solution cooled and water added carefully to precipitate a solid. This solid was filtered off, washed neutral with water, dried and crystallised from methylene dichloride: ether to give 2β-acetoxy-3α-acetamido-5α-androstan-17-one in needles (6.42 g) m.p. 227°–229°.

In a similar manner the following compounds were prepared:
2β,17β-diacetoxy-3α-acetamido-5α-androstane
2β-acetoxy-3α-acetamido-5α-androstane-11,17-dione
2β,11α-diacetoxy-3α-acetamido-5α-androstane-17-one
2β-acetoxy-3α-acetamido-5α-androstan-11β-ol-17-one
2β,11α-diacetoxy-3α-acetamido-5α-androstan-17-one
2β-acetoxy-3α-acetamido-5α-pregnan-20-one
2β,20β-diacetoxy-3α-acetamido-5α-pregnane
2β-acetoxy-3α-acetamido-5α-pregnane-11,20-dione
2β,11α-diacetoxy-3α-acetamido-5α-pregnan-20-one
2β-acetoxy-3α-acetamido-5α-pregnan-11β-ol-20-one
2β,20β-diacetoxy-3α-acetamido-5α-pregnan-11-one.

EXAMPLE VI

2β-Hydroxy-3α-amino-5α-androstan-17-one (2.5 g) was added to acetic anhydride (10 ml) at 20° and the reaction stirred for 10 minutes; almost immediately a product began to crystallise out. Water was added to precipitate completely a white solid (2.43 g) which was filtered off, washed with water, dried and crystallised from methylene dichloride: ether to give 2β-hydroxy-3α-acetamido-5α-androstan-17-one in prisms (2.28 g), m.p. 239–243°.

In a similar manner the following compounds were prepared:
2β-hydroxy-3α-acetamido-5α-androstane-11,17-dione
2β,11α-dihydroxy-3α-acetamido-5α-androstan-17-one
2β,11β-dihydroxy-3α-acetamido-5α-androstan-17-one
2β-hydroxy-3α-acetamido-5α-pregnan-20-one
2β-hydroxy-3α-acetamido-5α-pregnane-11,20-dione
2β,11α-dihydroxy-3α-acetamido-5α-pregnan-20-one
2β,11β-dihydroxy-3α-acetamido-5α-pregnan-20-one.

EXAMPLE VII

A solution of 2β-hydroxy-3α-azido-5α-androstan-17-one (5 g) in acetic anhydride (10 ml) and pyridine (10 ml) was heated at 90° for 45 minutes. The product was worked up in the usual manner and crystallised from hexane to give 2β-acetoxy-3α-azido-5α-androstan-17-one (4.4 g), m.p. 107°–109°.

This azide (2 g) was hydrogenated in ethanol (20 ml) over 5% palladium: charcoal catalyst (0.5 g) to give 2β-acetoxy-3α-amino-5α-androstan-17-one which crystallised from ether.

In a similar manner the following compounds and their hydrochloride salts were prepared:
2β-acetoxy-3α-amino-5α-androstane-11,17-dione
2β,11α-diacetoxy-3α-amino-5α-androstan-17-one
2β-acetoxy-3α-amino-5α-androstan-11β-ol-17-one
2β-acetoxy-3α-amino-5α-pregnan-20-one
2β-acetoxy-3α-amino-5α-oestran-17-one.

What is claimed is:

1. A 2β-hydroxy-3α-amino-steroid of the group consisting of the oestrane, androstane and pregnane series, of the formula:

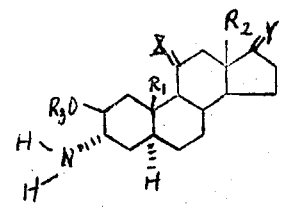

in which $R_1$ is selected from the group consisting of hydrogen and methyl;
$R_2$ is methyl;
$R_3$ is selected from the group consisting of hydrogen and acyl derived from an aliphatic, cycloaliphatic, aromatic or araliphatic carboxylic having 1–18 carbon atoms;
X is selected from the group consisting of $H_2$, $H(OR_3)$ and O;
Y is selected from the group consisting of O, $H(\beta OR_3)$, $H(\beta COCH_3)$ and $H(\beta CHOR_3CH_3)$;
and the pharmaceutically acceptable acid addition salts and N-mono-acyl derivatives thereof.

2. A 2-β-hydroxy-3α-amino-steroid of the formula:

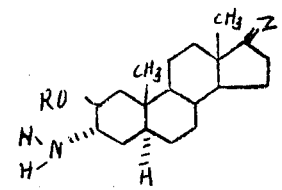

in which Z is selected from the group consisting of O, H(OH) and $COCH_3$;
R is selected from the group consisting of H and acetyl; and the pharmaceutically acceptable acid addition salts and N-acetyl derivatives thereof.

3. A member of the group consisting of 2β-hydroxy-3α-amino-5α-androstan-17-one and its hydrochloric acid addition salt.

* * * * *